United States Patent [19]

Ueno et al.

[11] Patent Number: 5,268,254
[45] Date of Patent: Dec. 7, 1993

[54] OPTICAL RECORDING MEDIUM

[75] Inventors: Osamu Ueno; Hideo Kobayashi; Kiichi Ueyanagi, all of Kanagawa, Japan

[73] Assignee: Fuji Xerox Co., Ltd., Tokyo, Japan

[21] Appl. No.: 24,243

[22] Filed: Mar. 1, 1993

Related U.S. Application Data

[63] Continuation of Ser. No. 485,315, Feb. 28, 1990, abandoned.

[30] Foreign Application Priority Data

Feb. 28, 1989 [JP] Japan ................................ 1-45414
Sep. 18, 1989 [JP] Japan ................................ 1-240054

[51] Int. Cl.$^5$ .............................................. G03C 1/72
[52] U.S. Cl. ...................................... 430/271; 430/19; 430/270; 430/290; 430/495; 430/523; 430/964
[58] Field of Search .............. 430/19, 270, 271, 290, 430/495, 523, 964, 945

[56] References Cited

U.S. PATENT DOCUMENTS

| | | | |
|---|---|---|---|
| 4,357,616 | 11/1982 | Terao et al. | 430/495 |
| 4,414,273 | 11/1983 | Wada et al. | 346/135.1 |
| 4,434,429 | 2/1984 | Terao et al. | 346/135.1 |
| 4,460,636 | 7/1984 | Watanabe | 428/433 |
| 4,476,214 | 10/1984 | Zalm et al. | 430/495 |
| 4,531,183 | 7/1985 | Morimoto et al. | 346/135.1 |
| 4,637,976 | 11/1987 | Terao et al. | 430/495 |
| 4,645,712 | 2/1987 | Ishigaki et al. | 346/135.1 |
| 4,877,700 | 10/1989 | Lutz et al. | 430/945 |
| 4,954,379 | 9/1990 | Nishida et al. | 430/945 |

FOREIGN PATENT DOCUMENTS

| | | | |
|---|---|---|---|
| 217293 | 4/1987 | European Pat. Off. | 430/945 |
| 60-34897 | 2/1985 | Japan | 430/19 |
| 60-257291 | 12/1985 | Japan | 430/945 |
| 61-89889 | 5/1986 | Japan | 430/19 |
| 61-107546 | 5/1986 | Japan | 346/135.1 |
| 61-130093 | 6/1986 | Japan | 430/945 |
| 61-284484 | 12/1986 | Japan | 430/945 |

OTHER PUBLICATIONS

Eurpean Search Report, EP 90 10 3877, Aug. 13, 1990.
Derwent Patent Abstract No. 198335, Week 32, 1984.
Patent Abstracts of Japan, vol. 11, No. 203 (P-591) (2650), Jul. 2, 1987.
Patent Abstracts of Japan, vol. 13, No. 27 (P-815) (3327), Jan. 20, 1989.
Chen et al., "Compound Materials for Reversible, Phase-Change Optical Data Storage", Appl. Phys. Lett., vol. 49, No. 9, Sep. 1, 1986, pp. 502-504.

Primary Examiner—Richard L. Schilling
Attorney, Agent, or Firm—Finnegan, Henderson, Farabow, Garrett & Dunner

[57] ABSTRACT

An optical recording medium capable of recording, rewriting and erasing information utilizing changes in optical properties is disclosed, which comprises a substrate having thereon a layer of a recording material that changes reversibly in optical properties thereof upon irradiation with light or application of heat, wherein the recording material consists essentially of at least one element of Group Vb of the periodic table selected from the group consisting of As, Sb, and Bi and at least one element of Group VIb of the periodic table selected from the group consisting of S, Se, and Te; and has a composition corresponding to that of a mixture of at least two stoichiometric compounds represented by the chemical formula Vb-hd 2VIb$_3$; and contains at least one of Se and Te.

12 Claims, 7 Drawing Sheets

OPTICAL RECORDING MEDIUM

This application is a continuation of application Ser. No. 07/485,315, filed Feb. 28, 1990, now abandoned.

FIELD OF THE INVENTION

The present invention relates to a rewritable optical recording medium in which information is recorded, reproduced, or erased by means of a light beam, such as a laser light beam, which is focused on the recording medium to cause the irradiated regions to undergo changes in optical properties. More particularly, this invention relates to an improved optical recording medium in which information can be rewritten stably in a wide linear speed range and the recorded information can be stored for a prolonged period of time.

BACKGROUND OF THE INVENTION

Among conventional rewritable optical recording media in which information is recorded by means of laser light or other light is an magneto-optical recording medium, which has been put to practical use in some fields. In this system, information is recorded by creating regions of reverse magnetization in a recording material layer by means of light energy and magnetic field, and reproduced signals are obtained by detecting differences in the angle of Faraday rotation or Kerr rotation due to magnetization direction. This system, however, is disadvantageous in that since there is no practical method for rewriting information at least within one sector, it has been of limited application.

Another rewritable optical recording medium is a so-called phase-change optical recording medium, which utilizes the crystalline-amorphous phase change and is now being studied. In this system, information can be rewritten within one sector by means of two light beams (that is, recorded information is erased by the first beam and new information is then recorded by the second beam). Another advantage of this system is that in the case of a recording medium employing a recording material which shows a short crystallization time, overwriting (simultaneous erasing and writing) can be performed by means of one light beam, so that this system is of wide application in many fields.

As recording materials for use in such phase-change optical recording media, GeTe (*Appl. Phys. Lett.*, 49 (1986) 502), In-Se-Tl-Co (*Jpn. J. Appl. Phys.*, 26 Supplem. (1987) 67), and Ge-Sb-Te (JP-A-63-225934) have been proposed. (The term "JP-A" as used herein means an "unexamined published Japanese patent application".) In general, recording on the phase-change optical recording medium is conducted by focusing a light beam, such as a semiconductor laser beam, on the layer of a recording material, such as those mentioned above, to melt the recording material in the irradiated regions and then rapidly cooling the melted recording material to form regions in an amorphous phase in accordance with the information to be recorded. For erasing the thus-recorded information, the amorphous-phase regions are irradiated with a focused light beam having a low power compared to the light beam used for recording to maintain the recording material in the irradiated regions at a crystallization temperature for a certain period of time, whereby the phase of the regions are changed back into crystalline one.

Recording materials for use in such phase-change optical recording media are preferably ones which show short crystallization times from the standpoint of simplifying the optical system or attaining improved phase change speed, and which are highly stable in their amorphous phase from the standpoint of storing recorded information for a prolonged period of time.

Among the above-mentioned conventional phase-change type recording materials, Ge-Sb-Te has been thought to be one of the best materials which possesses the above two properties. Illustratively stated, the Ge-Sb-Te disclosed in JP-A-63-225934 is prepared by mixing $Sb_2Te_3$, which has a short crystallization time but is insufficient in amorphous phase stability, with GeTe, which is good in amorphous phase stability but has a long crystallization time, and hence the Ge-Sb-Te has been regarded as intermediate in properties between $Sb_2Te_3$ and GeTe.

However, the GeTe part constituting the above Ge-Sb-Te disadvantageously has the property of not rapidly changing into amorphous phase, as described in *Appl. Phys. Lett.*, 49 (1986) 502, and hence, the Ge-Sb-Te also has the defect of being less apt to form an amorphous phase as compared with $Sb_2Te_3$. For this reason, optical recording media employing such Ge-Sb-Te have a disadvantage that cooling after melting should be conducted at a considerably high rate in order to attain stable recording.

Although the cooling rate may be heightened by increasing the moving speed (linear speed) of the light spot, this method is disadvantageous in that as a result of the increased linear speed, the time during which regions of information to be erased are maintained at a temperature not lower than the crystallization temperature in erasing (crystallization) operations is reduced, resulting in insufficient erasing. That is, in the case of the optical recording media employing the above-described Ge-Sb-Te, even if the recording material is improved so as to have a short crystallization time, it becomes necessary to increase the linear speed because such improvement results in difficulties in changing the recording material into amorphous state. Thus, satisfactory erasing properties cannot be obtained. The recording media of the above kind have had problems that the quality of reproduced signals is poor due to the information remaining unerased, waveform distortion at the edges, etc., and that the increased linear speed leads to decrease in recording sensitivity.

In place of increasing the linear speed, there may be a method in which the cooling rate is increased by providing the optical recording media with a cooling layer having a high thermal conductivity. This method, however, is also disadvantageous in that the increased cooling rate leads to decrease in erasing property and in recording sensitivity, as in the above-mentioned case, and that the production costs for the optical recording media are raised.

Further, the above-described Ge-Sb-Te optical recording media require high intensity light source such as semiconductor laser to enable stable recording by way of changing the phase from a crystalline state to an amorphous state. Furthermore, the S/N of the recording media varies to a great extent even with slight changes in output of the focused light beam. For the reasons, the recording media are subjected to exposure to high intensity light every time when rewriting the recorded information, and in turn, the recording material used therein is deteriorated by heat to cause changes in recording characteristics for a short period of time.

SUMMARY OF THE INVENTION

An object of the present invention is to provide an optical recording medium in which a recording material layer has a shortened crystallization time and improved stability in an amorphous phase while maintaining its property of easily changing into amorphous state, and in which information can be stably rewritten over a wide linear speed range and recorded information can be stored for a prolonged period of time.

Another object of the present invention is to provide an optical recording medium that is capable of high speed recording or rewriting even without use of high intensity light and is free from deterioration of recording characteristics even after a number of rewriting operations and that is capable of maintaining the recorded information for a long period of time.

These objects are achieved by an optical recording medium which is capable of recording, reproducing or erasing information by means of optical change and which comprises a substrate plate having thereon a layer of a recording material that changes reversibly in optical properties thereof upon irradiation with light or application of heat or by similar means, wherein the recording material consists essentially of at least one element of Group Vb of the periodic table selected from the group consisting of As, Sb, and Bi and at least one element of Group VIb of the periodic table selected from the group consisting of S, Se, and Te, has a composition corresponding to that of a mixture of at least two stoichiometric compounds represented by the chemical formula $Vb_2VIb_3$, and contains at least one of Se and Te.

DETAILED DESCRIPTION OF THE INVENTION

Examples of the above stoichiometric compounds of the $Vb_2VIb_3$ type include compounds containing one kind of the Vb elements and one kind of the VIb elements (e.g., as $Sb_2Se_3$, $Sb_2Te_3$, $Sb_2S_3$, $Bi_2Se_3$, $Bi_2Te_3$, $Bi_2S_3$, $As_2Se_3$, $As_2Te_3$, and $As_2S_3$) and compounds containing one or more kinds of the Vb elements and one or more kinds of the VIb elements (e.g., $Sb_2SeTe_2$, $Bi_2SeTe_2$, $Bi_2Se_2Te$, and $Bi_2STe_2$).

The recording material has a composition corresponding to that of a mixture of at least two stoichiometric compounds of the above-described $Vb_2VIb_3$ type, and the mixture preferably contains one of the $Vb_2VIb_3$ type stoichiometric compounds in an amount of from 5 to 95 mol% based on the mixture.

Any recording material can be employed as long as it is composed of at least three kinds of elements one or more of which are selected from Group Vb elements of As, Sb, and Bi and one or more of which are selected from Group VIb elements of S, Se, and Te, and contains at least one of Se and Te. The total content of Se and Te in the recording material is preferably not less than 30 atomic% based on the total atoms constituting the recording material. Examples of such recording materials include a ternary composition consisting of three elements including Se or Te, a quaternary composition consisting of four elements including Se or Te, and compositions consisting of five or more elements including Se or Te. Specific examples of the recording material include: mixtures composed of at least three elements selected from the above-specified elements and including Se or Te; stoichiometric compounds formed from the above mixtures, such as $Sb_2SeTe_2$, $Bi_2SeTe_2$, and $Bi_2Se_2Te$; congruent compounds (stoichiometric compounds which do not decompose to other substances until their melting points) formed from the above mixtures, such as $Bi_2STe_2$; and solid solutions composed of at least three elements selected from the above-specified elements and including Se or Te. Specific examples thereof further include mixtures obtained by mixing two or more of the above-described stoichiometric compounds and solid solutions in arbitrary proportions, and mixtures obtained by mixing such mixtures with the above-described $Vb_2VIb_3$-type stoichiometric compounds in arbitrary proportions.

Of these recording materials, a solid solution represented by $(Sb_2Te_3)_{1-x}(Bi_2Se_3)_x$ wherein $0<x<0.3$ is particularly preferred since the resulting optical recording medium is capable of high speed recording or rewriting without use of high intensity light and is free from deterioration of recording characteristics even after a number of rewriting operations.

Figure 4:
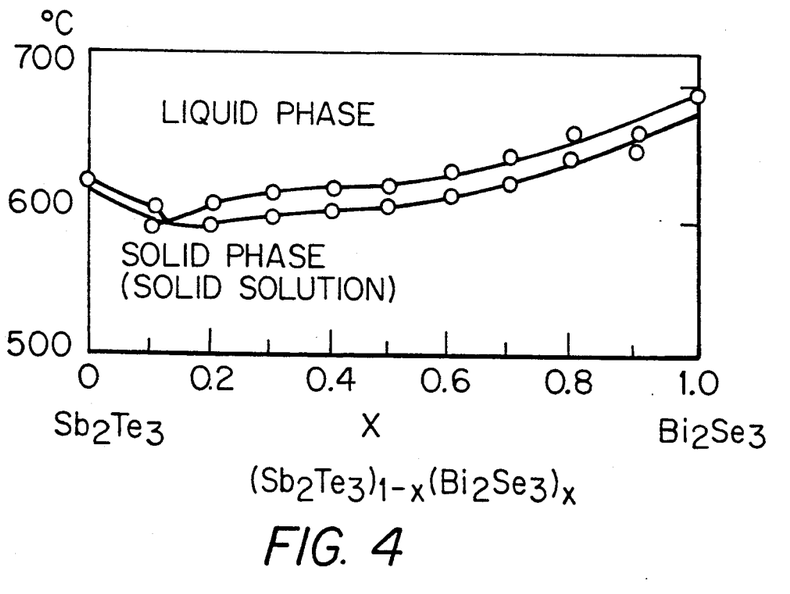
FIG. 4 shows a pseudo-binary system phase diagram of recording materials used in Examples 3 and 4.
Figure 5:
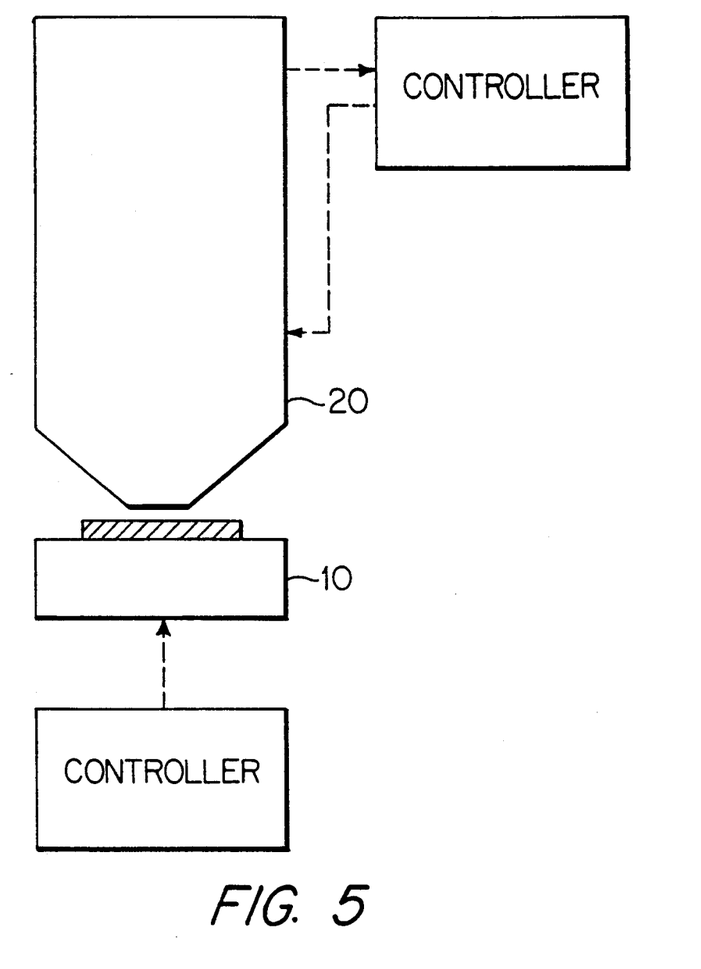
FIG. 5 illustrates an equipment for measuring a crystallization temperature.

As is appeared from the pseudo-binary system phase diagram shown in FIG. 4, the recording material composed of $Sb_2Te_3$ and $Bi_2Se_3$ is a solid solution wherein both $Sb_2Te_3$ and $Bi_2Se_3$ melt each other in any mixing ratio (wholly solid solution). Further the recording material $(Sb_2Te_3)_{0.85}(Bi_2Se_3)_{0.15}$ ($x=0.15$) is a congruent solid solution which possesses a peculiar melting point and which does not decompose to other substances below the melting point. A recording layer using such a solid solution is formed of a single phase and does not undergo phase separation in its crystalline phase, providing the advantages that the crystallization time is shortened and the recording characteristics do not change even after a number of rewriting operations. With a congruent solid solution, more stable recording characteristics can be obtained as segregation does not occur in the congruent solid solution during cooling.

The value of $x$ in $(Sb_2Te_3)_{1-x}(Bi_2Se_3)_x$ is within the range of $0<x<0.3$ and preferably $0.05 \leq x<0.3$.

The term "solid solution" herein used means a phase wherein atoms located at lattice points in a crystalline phase peculiar to an element or a compound are replaced irregularly with another atom, or wherein another atom is statistically distributed between the lattice gap of a crystalline phase peculiar to an element or a compound. Namely, the solid solution is considered to be a phase wherein another material appears to be homogeneously dissolved in the crystalline phase.

The basic structure of the optical recording medium of the present invention comprises a light-transmitting substrate having thereon, a layer of the recording material generally having a thickness of from 10 to 200 nm and preferably from 20 to 40 nm. A protective layer may be formed on the recording material layer for the purpose of preventing the recording material layer from being deformed in the period of from melting to solidification or for protecting the recording material layer from mechanical damages or oxidation.

As the light-transmitting substrate, a glass plate or a plate of a resin material such as an acrylic, polycarbonate or epoxy resin, or the like may be used. In the case where the resin material is employed as the substrate, an inorganic dielectric layer consisting, for example, of $SiO_2$, $ZrO_2$, ZnS, $Si_3N_4$, $Ta_2O_5$, AlN, $Al_2O_3$, etc., or a mixture thereof may be provided between the recording material layer and the substrate for preventing thermal damages of the resin plate. The thickness of the inorganic dielectric layer is generally from 50 to 200 nm. In the case where an optical recording medium in which information is recorded, reproduced, or erased by irradiating the recording medium with focused light from the side of the layer of a recording material instead of the substrate side, the substrate may, of course, be made of a light-untransmitting material such as aluminum etc.

Examples of materials constituting the above-described protective layer include the same materials as those mentioned above as the material constituting the inorganic dielectric layer, and further include resin materials such as UV-curable resins, acrylic resins, polycarbonates, and epoxy resins, glasses, etc. The protective layer may be of a single-layer structure, or may be a multilayer structure formed by superposing two or more of the above materials. The thickness of the protective layer is generally from 10 to 200 nm.

If a resin material is used for the protective layer which is in contact with the recording layer, an inorganic dielectric layer may be provided between the two layers, as in the case of the substrate and the recording material layer. Further, an adhesive layer of 1 to 10 μm in thickness may also be provided between the protective layer and the inorganic dielectric layer. For the purpose, conventional adhesives such as a UV-curable adhesive may be used.

Although conventional optical recording media have been required to be provided with a thermal diffusion layer made of a metallic material such as metals (e.g., Au, Al, Ni, Cr, Ag, Cu and Ti) and metal alloys thereof in order to increase their cooling rates, such a thermal diffusion layer is basically not mandatory in the optical recording medium of this invention. If desired, the thermal diffusion layer may, of course, be formed, for example, between the layer of a recording material and the inorganic dielectric layer which is formed on the side opposite to the side to be irradiated with a light beam. The thickness of the thermal diffusion layer is generally from 10 to 200 nm.

For forming the recording material layer described above, a sputtering method, a vacuum deposition method or the like may be utilized. As the sputtering method, simultaneous sputtering may be conducted in which plural targets are used, and an intended composition is synthesized and deposited on a substrate to form a layer of the composition by suitably controlling the amount of power applied to each target. Alternatively, sputtering may be carried out by use of one target of an alloy corresponding to the intended composition. As the plural targets for use in the above-described simultaneous sputtering, targets of alloys consisting essentially of stoichiometric compounds of the $Vb_2VIb_3$ type described above; targets of alloys formed by blending Group Vb element(s) with Group VIb element(s), both selected from the above-specified elements, in arbitrary proportions; or single-element targets each consisting of one element selected from the Group Vb and Group VIb elements specified above may be used.

As the vacuum deposition, a co-deposition technique may be employed in which plural evaporation sources are used, and an intended composition is produced and deposited on a substrate to form a layer of the composition by controlling the rate of the evaporation of each source.

In the optical recording medium according to the present invention, the amorphous-phase regions in the recording material layer may correspond to information-recorded regions with the crystalline-phase regions corresponding to information-erased regions, as in conventional optical recording media. Conversely, the amorphous-phase regions in the recording material layer may be used as information-erased regions with the crystalline-phase regions being used as information-recorded regions. Either of the two methods can be arbitrarily selected.

According to the present invention, since the recording material consists essentially of at least one Group Vb element selected from the group consisting of As, Sb, and Bi and at least one Group VIb element selected from the group consisting of S, Se, and Te and has a composition corresponding to that of a mixture of at least two stoichiometric compounds represented by the chemical formula $Vb_2VIb_3$, formation of an amorphous phase in the recording material layer is easy; the resulting amorphous-phase regions is highly stable; and at the same time, the recording material layer can have a reduced crystallization time.

With respect to the reasons why the recording material layer employed in the optical recording medium of the present invention easily forms an amorphous phase compared to the conventional Ge-Sb-Te recording material layers, the present inventors presume as follows.

Concerning the amorphous phase-forming tendency (the ability to form an amorphous phase), there has been a theory proposed by J.C. Phillips, (*J. Non-cryst. Solids*, 34 (1979) 153 that the number of bonds per atom (coordination number) is important, and when the average coordination number m for a material is from 2 to 3 (preferably 2.45), the ability of the material to form an amorphous phase is high.

By applying the above theory to optical recording media based on the assumption that the average coordination number m may be calculated from the maximum numbers of bonds for the atoms, it can be presumed that among the conventional recording materials, $Sb_2Te_3$ easily forms an amorphous phase because its m value is 2.4, which is close to the ideal value, while GeTe is less apt to form an amorphous phase because its m value is 3, which is relatively away from the ideal value. This presumption is in good agreement with experimental results. The above assumption that the average coordination number m may be calculated from the maximum numbers of bonds for the atoms means that the average coordination number m is calculated based on the proportions of respective elements, with the number of bonds for a Group IVb element being taken as 4, that for a Group Vb element as 3, and that for a Group VIb element as 2. Although the atoms in actual materials are not always bonded at such maximum numbers of bonds and there is a description in the above-mentioned literature, *J. Non-cryst. Solids*, 34 (1979) 153, to the effect that the ideal value somewhat varies with materials but the tendency does not change. Hence, the above assumption that the average coordination number m may be calculated from the maximum numbers of bonds for the atoms is not necessarily wrong.

Therefore, by applying the above view to a ternary system, it is believed that the Ge-Sb-Te recording material, which is a mixture of $Sb_2Te_3$ with GeTe, becomes less apt to form an amorphous phase as the proportion of GeTe increases, because higher the GeTe proportion, the greater the difference between the average coordination number m and the ideal value. On the other hand, in the case of the optical recording medium of this invention, since the recording material has a composition corresponding to that of a mixture of at least two stoichiometric compounds of the $Vb_2VIb_3$ type having average coordination numbers m close to the ideal value, the average coordination number for the recording material as a whole is also close to the ideal value and, hence, the recording material layer can easily form an amorphous phase.

The reasons why such recording material layer in the optical recording medium of this invention has a short crystallization time as compared to the conventional Ge-Sb-Te are as follows. Because the stoichiometric compound of the $Vb_2VIb_2$ type is a compound having strong covalent bonds, the free energy of the compound in a crystalline phase is low, so that the free energy in a crystalline phase of the recording material having a composition corresponding to that of a mixture of such compounds is also low. Therefore, the difference in free energy between the crystalline phase and the amorphous phase (transformation energy) is large, and this results in a short crystallization time. On the other hand, the conventional Ge-Sb-Te, which is a mixture of $Sb_2Te_3$ having a short crystallization time with GeTe having a long crystallization time, necessarily has a longer crystallization time than the $Sb_2Te_3$.

The reason why the above-described recording material layer is highly stable in an amorphous phase is that since this recording material is a multi-element material consisting essentially of three or more elements (four elements in the case of the preferred recording material $(Sb_2Te_3)_{1-x}(Bi_2, Se_3)_x$, wherein $0<x<0.3$) the movement of atoms is effectively suppressed due to the different atomic radiuses and, hence, the activation energy of this recording material is higher than those of binary materials.

Furthermore, since the recording material employed in the optical recording medium contains at least one of Se and Te, the recording material layer has the property of absorbing visible light and near infrared light.

The present invention will be explained below in greater detail by reference to the following Examples.

EXAMPLE 1 AND COMPARATIVE EXAMPLE 1

Figure 1:
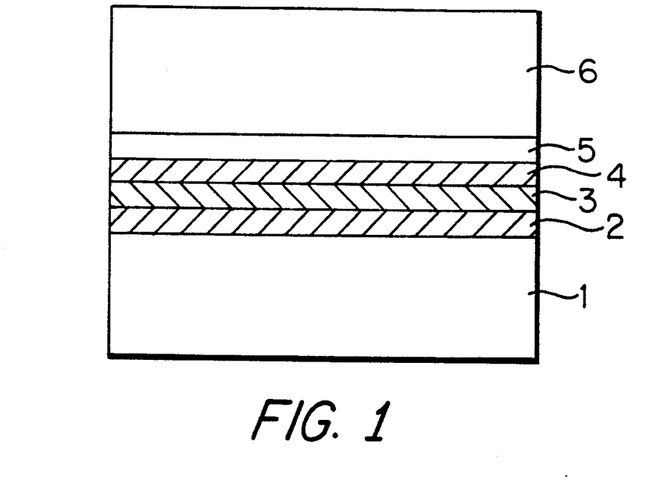
FIG. 1 is a cross-sectional view illustrating the layer structure of an optical recording medium according to the present invention.

Optical recording media produced and evaluated in this Example each had the layer structure as shown in FIG. 1. Specifically, each recording medium was comprised of, in sequence, a 1.2 mm-thick acrylic resin substrate (1), a 100 nm-thick inorganic dielectric layer (2) of $SiO_2$, a 100 nm-thick recording material layer (3) of Bi-S-Te, a 100 nm-thick inorganic dielectric layer (4) of $SiO_2$, an adhesive layer (5) of a UV-curable movable resin, and a 1.2 mm-thick protective plate (6) of an acrylic resin.

The recording material layer (3) in each of such optical recording media was formed by RF magnetron sputtering using two alloy targets consisting of $Bi_2Te_3$ and $Bi_2S_3$, respectively. In more detail, the alloy targets were mounted in the RF magnetron sputtering chamber, and the pressure in the chamber was reduced to $2\times10^{-6}$ Torr, followed by introducing argon gas to adjust the pressure to $4\times10^{-3}$ Torr. The RF power applied to the respective alloy targets was suitably controlled within the range of from 25 to 200 W to obtain recording material layers having compositions shown in Table 1 below.

In Table 1, optical recording media No. 4 and 5 are comparative samples prepared in the same manner as described above, except that a Bi-Te recording material and a Ge-Sb-Te recording material were formed, respectively (Comparative Example 1). The recording material layer in the sample No. 4 was formed by RF magnetron sputtering using one alloy target consisting of $Bi_2Te_3$, while that in the sample No. 5 was formed by RF magnetron sputtering using two alloy targets consisting of $Sb_2Te_3$ and GeTe, respectively.

Each of the thus-obtained optical recording media showed light absorption in the range of from the visible region to the near infrared region, showing that they were able to be used as optical recording media at least in the wavelength range of from 400 nm to 860 nm.

Hence, using a semiconductor laser emitting a laser beam with a wavelength of 830 nm as a light source, those recording media were evaluated for recording and erasing properties. The results obtained are summarized in Table 1.

The properties shown in Table 1 were evaluated based on the following criteria.

ABILITY OF FORMING AMORPHOUS PHASE

Recording media which formed an amorphous phase under conditions of 3 m/s linear speed are expressed by A, and ones which did not form an amorphous phase are expressed by B.

CRYSTALLIZATION TIME

Recording media which formed a crystalline phase in a period of 200 ns are expressed by A, and ones which did not form a crystalline phase are expressed by B.

STABILITY

Recording media having crystallization temperatures not lower than 120° C. are expressed by A, and ones having crystallization temperatures below 120° C. are expressed by B.

TABLE 1

| Sample No. | Composition of Recording Layer | Ability of Forming Amorphous Phase | Crystallization Time | Stability |
| --- | --- | --- | --- | --- |
| 1 | $(Bi_2Te_3)_{80}(Bi_2S_3)_{30}$ | A | A | A |
| 2 | $(Bi_2Te_3)_{67}(Bi_2S_3)_{33}$ | A | A | A |
| 3 | $(Bi_2Te_3)_{40}(Bi_2S_3)_{60}$ | A | A | A |
| 4 | $Bi_2Te_3$ | A | A | B |
| 5 | $(Sb_2Te_3)_{33}(GeTe)_{67}$ | B | A | A |

As apparent from Table 1, optical recording media Nos. 1 to 3 according to the present invention easily formed an amorphous phase compared to the comparative sample No. 5, and the crystallization times of the sample No. 1 to 3 are as short as those of the comparative sample No. 4 and 5. For this reason, recording and erasing of information in the optical recording media according to the present invention were able to be stably conducted in a linear speed range which was wider than that for conventional optical recording media. Further, the recording media of this invention had high crystallization temperatures compared to the comparative sample No. 4 and showed excellent stability in an amorphous phase.

Figure 2:
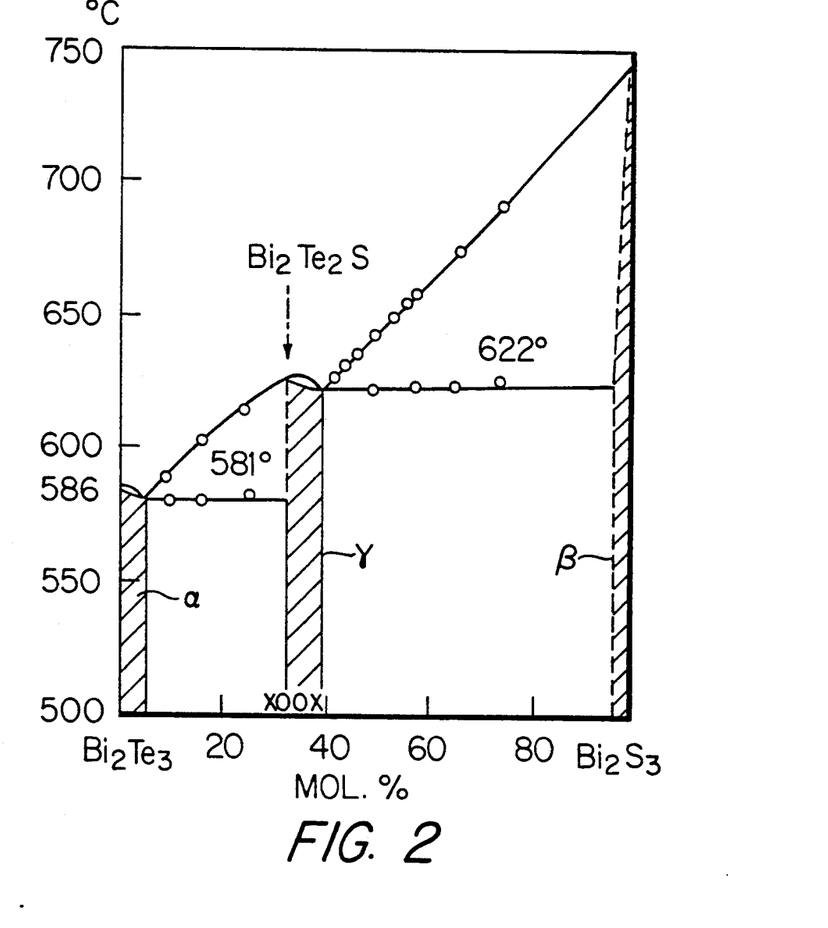
FIGS. 2 and 3 show pseudo-binary system phase diagrams for recording materials used in Examples 1 and 2, respectively.

In optical recording medium No. 2, in particular, the Bi-S-Te recording material in a crystalline phase was ascertained to be a single-phase material consisting of a stoichiometric compound of the chemical formula $Bi_2Te_2S$, as expected from the pseudo-binary system phase diagram shown in FIG. 2. This optical recording medium had a short crystallization time and was stable in repeated rewriting operations.

EXAMPLE 2

The optical recording media produced in this Example were substantially the same as those in Example 1 except that the recording material layers in the recording media of this Example consisted of Sb-Bi-Se-Te.

The recording material layers of Sb-Bi-Se-Te were formed by simultaneous sputtering using two alloy targets consisting of $Bi_2Te_3$ and $Sb_2Se_3$, respectively.

In the optical recording media produced in this Example, the recording material layers easily formed an amorphous phase, had short crystallization times, and were highly stable in an amorphous phase.

Figure 3:
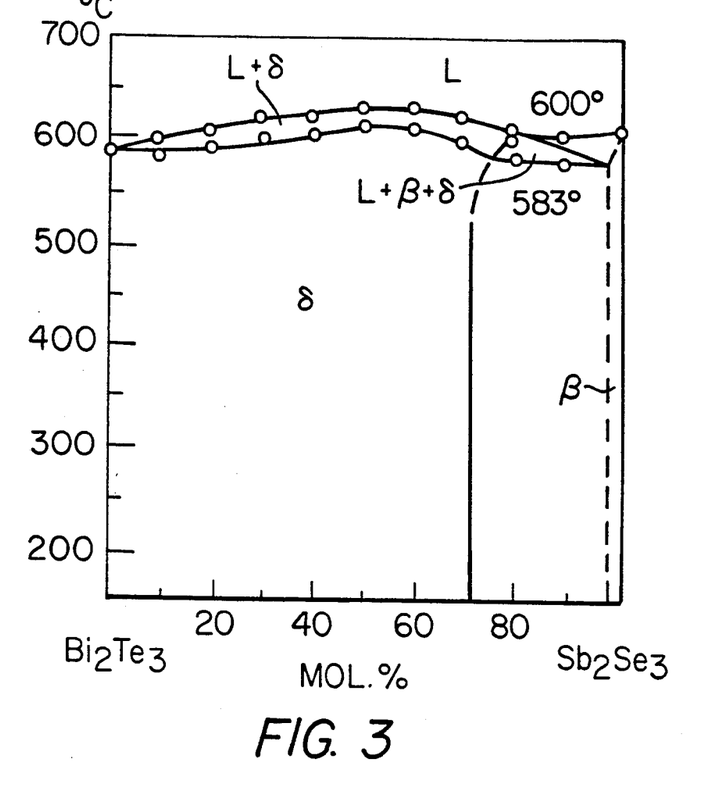

It was ascertained that where the molar percentage of $Sb_2Se_3$ was not higher than about 70%, such recording materials were a single-phase solid solution consisting of $Bi_2Te_3$ and $Sb_2Se_3$, as expected from the pseudo-binary system phase diagram shown in FIG. 3. Such optical recording media had short crystallization times and were stable in repeated rewriting operations.

EXAMPLE 3

An optical recording medium having the layer structure, as shown in FIG. 1 was prepared by forming on a 1.2 mm-thick glass substrate (1), in sequence, a 100 nm-thick inorganic dielectric layer (2) of ZnS by sputtering, a 100 nm-thick recording material layer (3) of $(Sb_2Te_3)_{0.85}(Bi_2Se_3)_{0.15}$ formed by sputtering, a 200 nm-thick inorganic dielectric layer (4) of ZnS formed by sputtering, an adhesive layer (5) of a UV-curable novlac resin, and a 1.2 mm-thick protective plate (6) of an acrylic resin.

The recording material layer (3) was formed by RF magnetron sputtering using two alloy targets, $Sb_2Te_3$ and $Bi_2Se_3$, and adjusting RF power to an appropriate level within the range of from 25 to 200 W and applying to the alloy targets.

EXAMPLE 4

An optical recording media was prepared in the same manner as in Example 3, except that the composition of the recording material layer was changed to $(Sb_2Te_3)_{0.75}(Bi_2Se_3)_{0.25}$.

COMPARATIVE EXAMPLE 2

An optical recording media was prepared in a similar manner as in Example 3, except that the recording material layer of $Ge_2Sb_2Te_5$ was formed by RF spattering using a single piece of $Ge_2Sb_2Te_5$ alloy target.

COMPARATIVE EXAMPLE 3

An optical recording medium was prepared in a similar manner as in Example 3, except that the recording material layer was $Sb_2Te_3$.

REFERENCE EXAMPLE

An optical recording medium was prepared in the same manner as in Example 3, except that the recording material layer was $(Sb_2Te_3)_{0.5}(Bi_2Se_3)_{0.5}$.

The following tests were performed to measure various characteristics of the optical recording media prepared in Examples 3 and 4, Comparative Examples 2 and 3 and Reference Example. In the tests, the amorphous-phase region and the crystalline-phase region in the recording material layer corresponded to an information-recorded region and an information-erased region, respectively.

CRYSTALLIZATION TEMPERATURE (Tx °C.)

Figure 6:
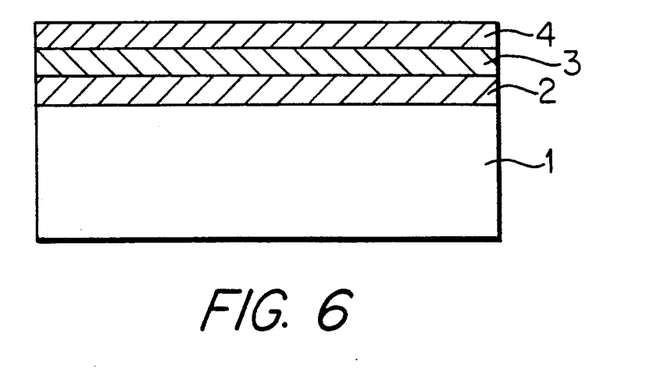
FIG. 6 shows a cross-sectional view of specimens installed in the aforesaid measuring equipment.

For measurement of crystallization temperature, specimens having the layer structure as shown in FIG. 6 were prepared by forming on a 1.2 mm-thick glass substrate (1) glass of 1.5 mm ×1.5 mm in size, a 100 nm-thick inorganic dielectric layer (2) of ZnS, a 100 nm-thick recording material layer (3) as described in Examples 3 and 4, Comparative Examples 2 and 3 and Reference Example, respectively, and a 200 nm-thick inorganic dielectric layer of ZnS.

Figure 7:
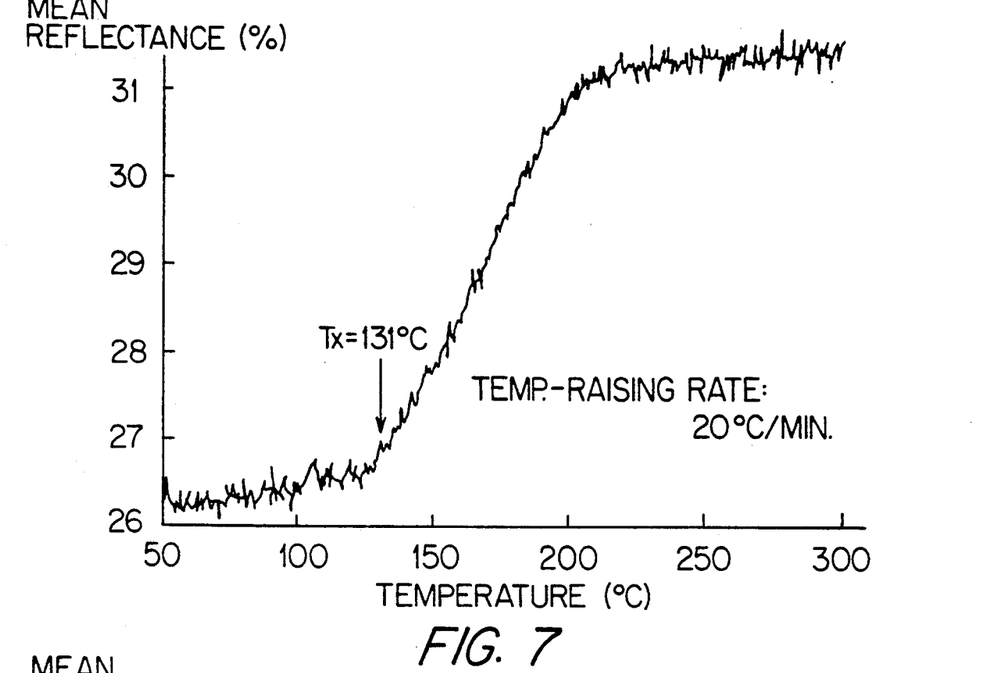
FIGS. 7 and 8 show relationships between a temperature and a mean reflectance with respect to specimens prepared in Example 3 and Comparative Example 3, respectively.
Figure 8:
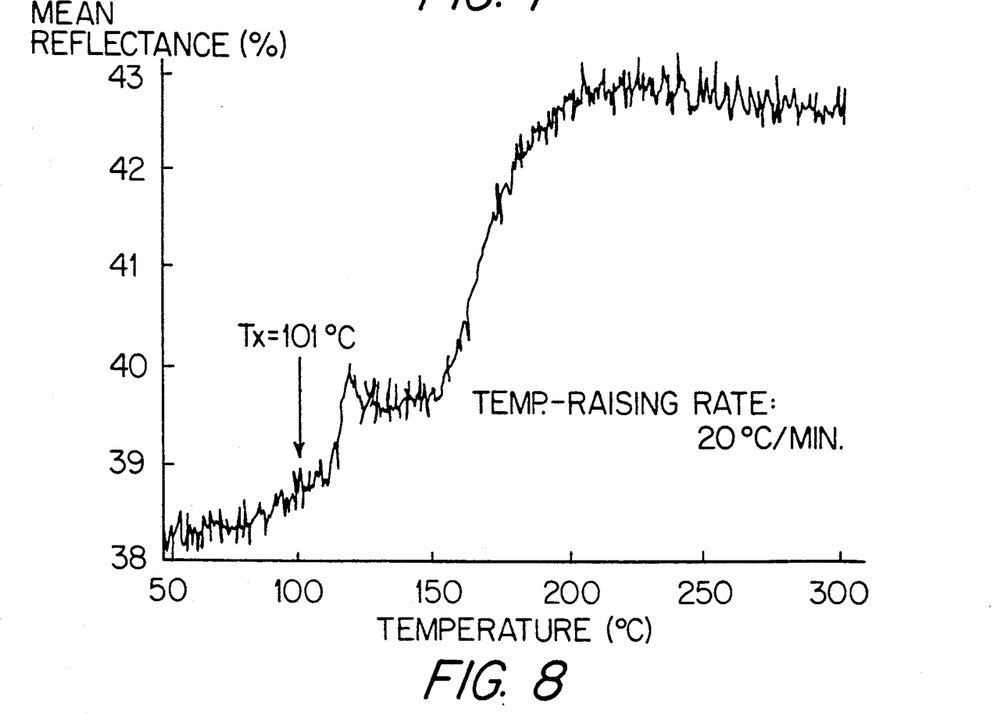

A number of amorphous marks of 1 μm in diameter was formed in a region of about 200 μm×200 μm square by irradiating laser beam onto the recording material layer of each specimen after heating the specimen at 300° C. in a heating device to crystallize the recording layer. Then, each specimen having amorphous marks thus formed was installed in a measuring equipment consisting of heating device (10) and spectrophotomicroscope (20). The amorphous marks of the specimen were gradually heated at a rate of 20° C./min to crystallize, and at the same time variation of mean reflectance of the 200 μm×200 μm square was measured. FIGS. 7 and 8 show relationships between the temperature and the mean reflectance with respect to Example 3 and Comparative Example 3, respectively.

The temperature at which the increase in reflectance reaches 10% of the total increase was defined as "crystallization temperature". The crystallization temperature as measured are shown in Table 2. The higher the crystallization temperature, the amorphous mark formed on the recording material layer is less liable to crystalize, and the high crystallization temperature means that the recorded information is retained for a long period of time.

CRYSTALLIZATION TIME (TX NS)

Each of the optical recording media prepared in Examples 3 and 4, Comparative Examples 2 and 3 and Reference Example was irradiated with a semiconductor laser beam of 820 nm with changing the laser power within the range of 1 to 30 mW and its pulse width within the range of 20 to 10000 ns so as to examine necessary conditions for the recording material layer to become crystalline or amorphous with an objective lens having a numerical aperture of 0.5.

The shortest pulse width at which the increase in reflectance of the recording material layer in an amorphous state reaches 10% of the reflectance in the amorphous state was defined as "crystallization time". The crystallization time as measured are shown in Table 2. The shorter time implies that the recording material layer is more easily crystallized, and this means that the recorded information is either erased or rewritten in the recording material layer at a higher speed.

POWER TO MAKE AMORPHOUS (PA mW)

The minimum laser power of laser beam having a pulse width of 100 ns with which the contrast in reflectance ($\Delta R/R$) as defined below reaches 0.01 was defined as "power to make amorphous". The minimum laser power was measured and the results are shown in Table 2. The lower is the power, more easily the recording material layer becomes amorphous and this means that the recording material layer possesses a higher sensitivity in writing and rewriting. Accordingly, the writing or rewriting is possible with a lower output laser and thus durability in repeated rewriting is improved due to less heat stress on optical recording media.

Figure 9:
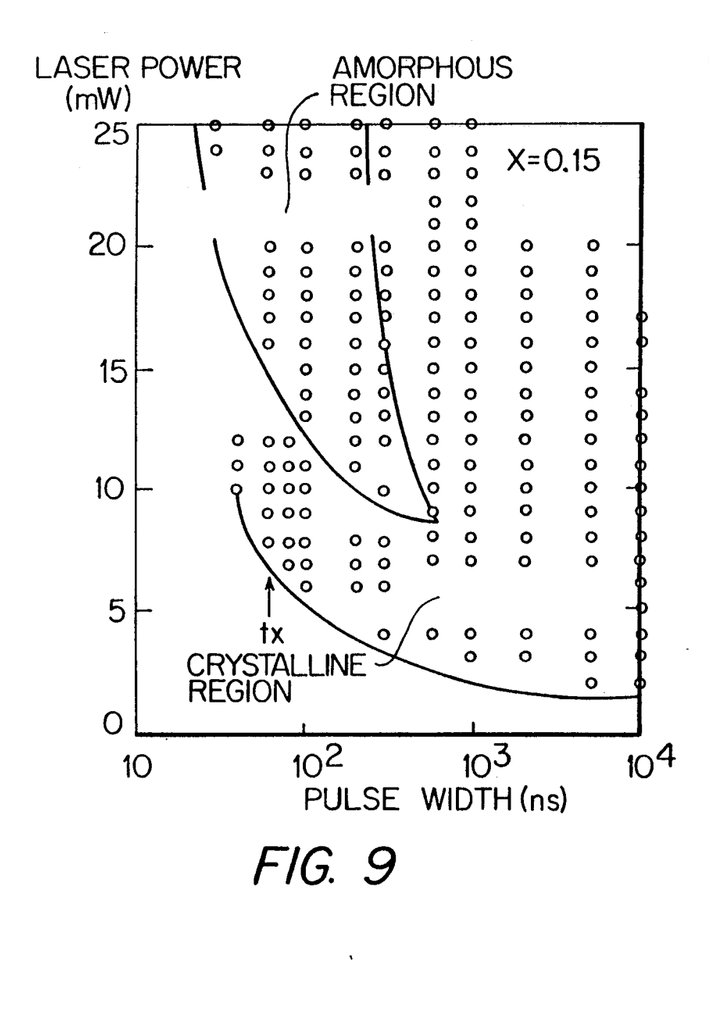
FIG. 9 shows relationship between a pulse width and a laser power of a specimen prepared in Example 3.
Figure 10:
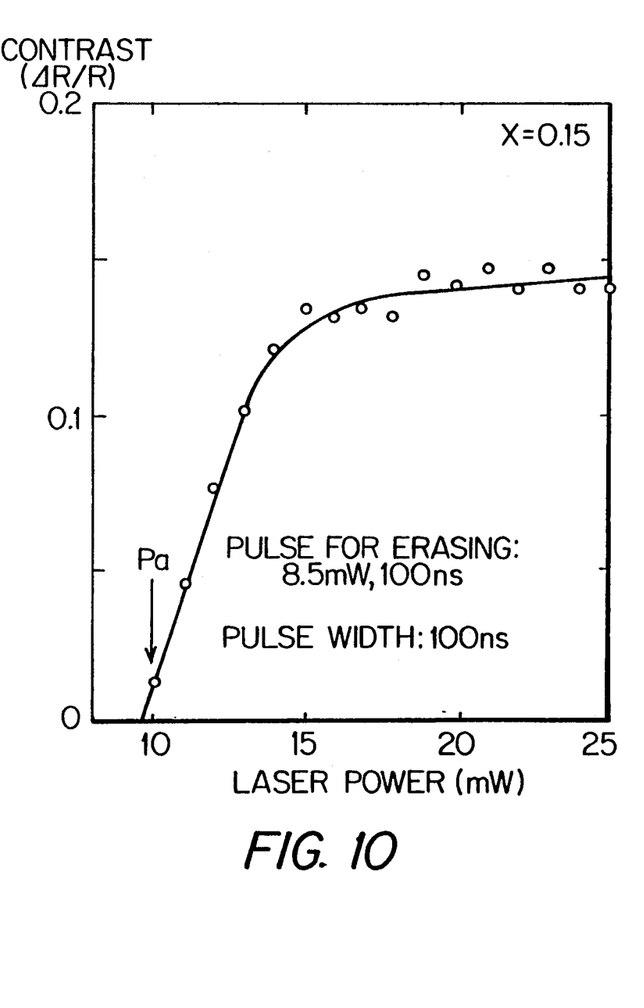
FIGS. 10 and 11 show relationships between a laser power and a contrast in reflectance at writing with respect to specimens prepared in Example 3 and Comparative Example 2, respectively.
Figure 11:
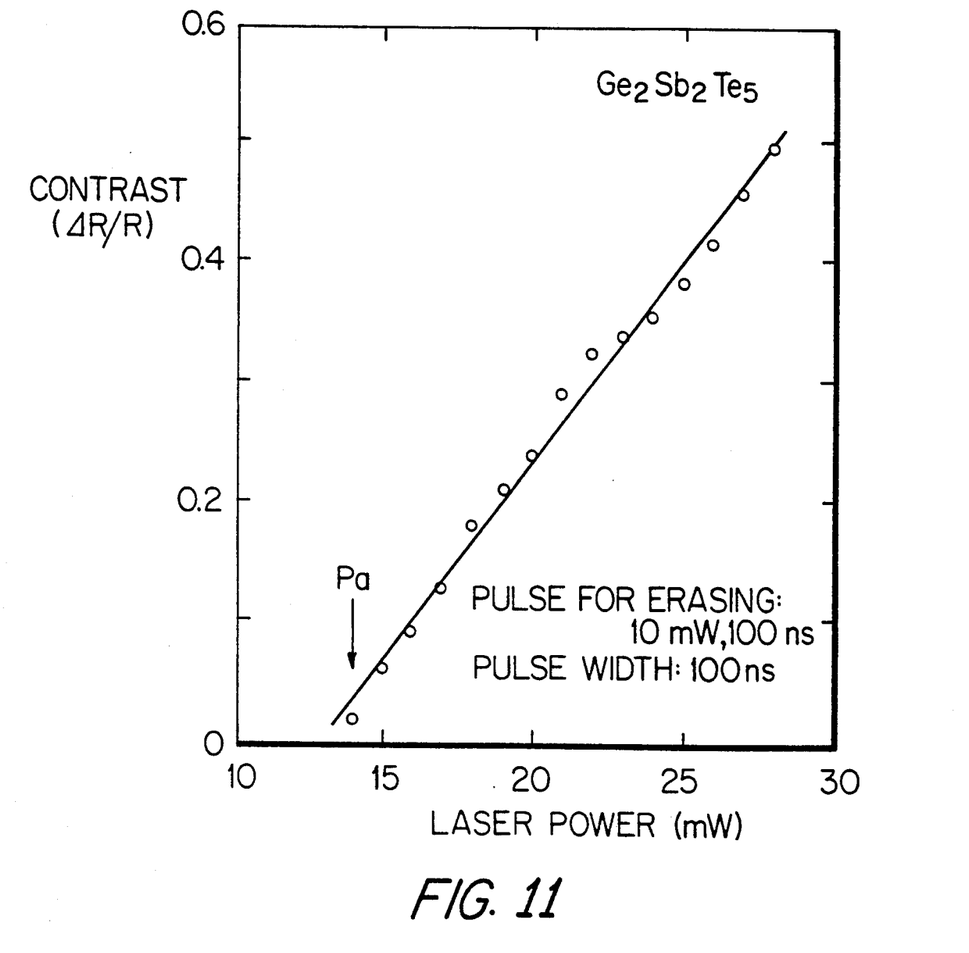

FIGS. 9 to 11 show the date obtained in the measurements of the crystallization time (tx ns) and the power to make amorphous (Pa mW).

FIG. 9 shows relationship between the pulse width and the laser power in the optical recording medium of Example 3 upon overwriting. FIG. 9 shows that the recording layer proceeds to an amorphous state, regardless of its prior state, with the laser pulse within the region shown by black dots, whereas the crystallization proceeds, regardless of its prior state, with the laser pulse within the region of white dots. It is seen from FIG. 9 that overwriting can be effected with a single light beam. The crystallization time (60 ns) as defined is pointed out by the arrow.

FIGS. 10 and 11 show relationships between the laser power and contrast in the reflectance in writing of the optical recording media of Example 3 and Comparative Example 2, respectively. The contrast in reflectance herein means a value represented by $\Delta R/R$ wherein R is the reflectance after recording and $\Delta R$ is the difference (increase) between the reflectance after erasing and the reflectance after recording (R). A small contrast ($\Delta R/R$) implies that a reproduced signal is obtained with difficulty and that the S/N tends to fluctuate with slight changes of laser output.

It is seen from FIG. 10 that writing of information can be effected on the optical recording medium of Example 3 with a laser power of about 10 mW and even if the laser output fluctuates the S/N is constant with a laser power of about 15 mW at which the contract ($\Delta R/R$) gets close to a constant value. In FIG. 10, the power to make amorphous (10 mW) as defined is pointed out by the array.

On the contrary, it is seen from FIG. 11 that writing of information cannot be effected on the optical recording medium of Comparative Example 2 unless the laser power is increased to more than 15 nW, and thus durability in repeated rewriting of the medium is poor and further that the contrast in reflectance ($\Delta R/R$) increases linearly as the laser power increases so that the S/N tends to fluctuate.

DURABILITY IN REPEATED REWRITING

Figure 12:
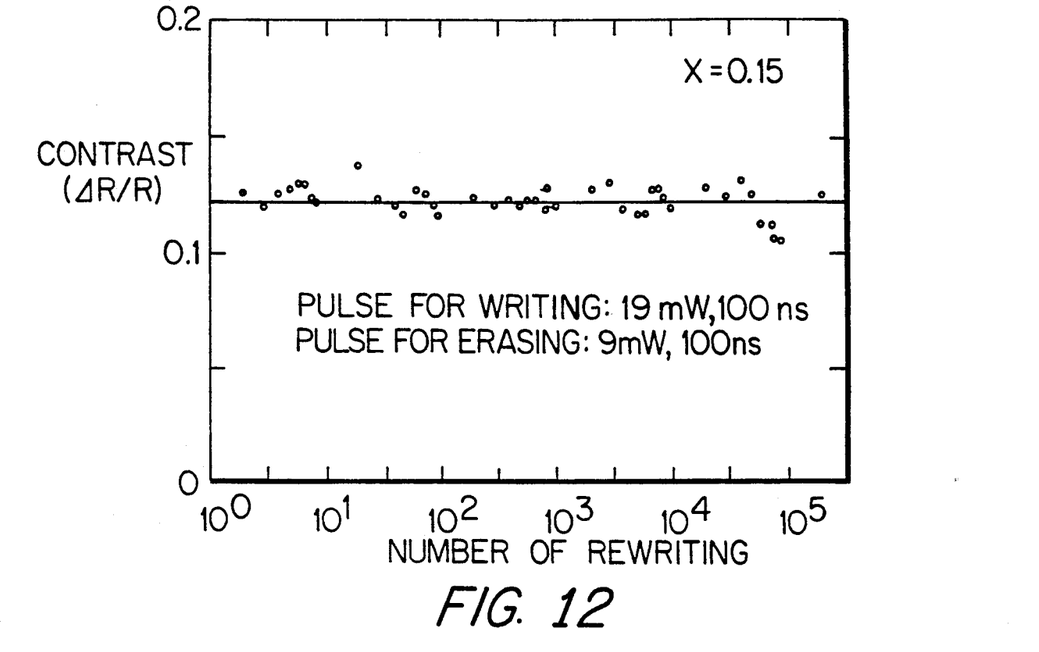
FIGS. 12 and 13 each shows durability in repeated rewriting with respect to recording media prepared in Example 3 and Comparative Example 2.
Figure 13:
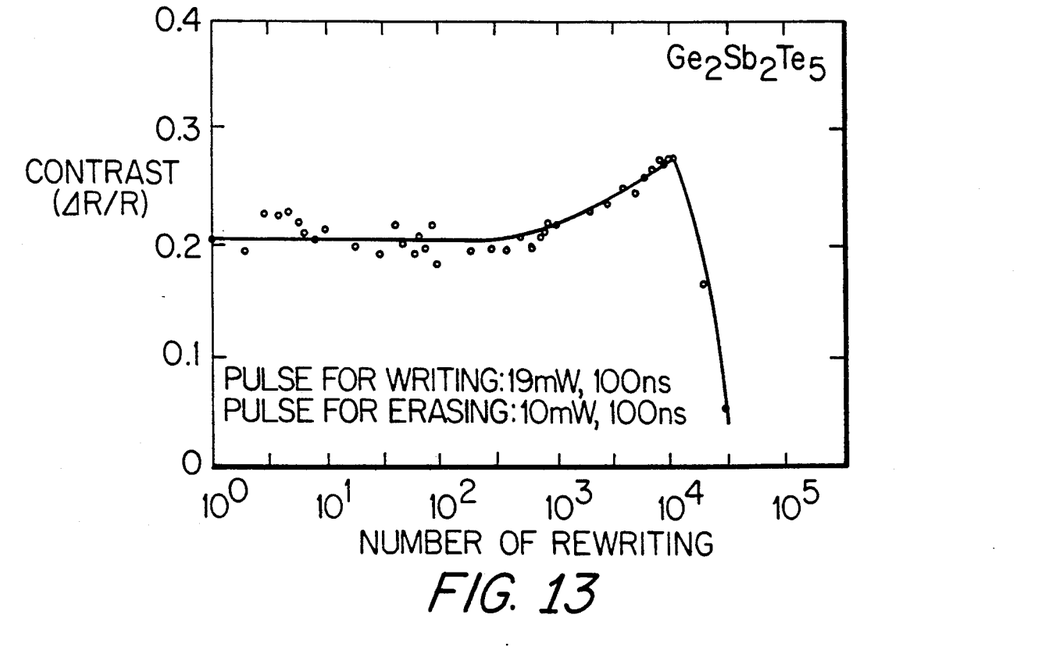

Using the optical recording media of Example 3 and Comparative Example 2, the durability in repeated rewriting was examined by irradiating laser pulse for recording and erasing alternatively. The pulse conditions for recording and erasing are 100 ns at 19 mW and 100 ns at 9 mW, respectively, for the optical recording medium of Example 3, whereas they are 100 ns at 19 mW for recording and 100 ns at 10 mW for erasing for the medium of Comparative Example 2. FIGS. 12 and 13 show relationships between the contrast ($\Delta R/R$) and the number of rewriting with respect to the optic recording media of Example 3 and Comparative Example 2, respectively. The abrupt decrease in contrast ($\Delta R/R$) at the repeated rewriting of $10^4$ as shown in FIG. 13 is considered to because strong stress generated in the inorganic dielectric layers (2) and (4) made of ZnS, which is adjacent to the recording material layer of $Ge_2Sb_2Te_5$ due to a large volume difference between the crystalline phase and the amorphous phase of $Ge_2Sb_2Te_5$, as compared to that in the medium of Example 3, so that the adjacent layers (2) and (4) were damaged. It is seen from FIGS. 12 and 13 that the optic recording medium of Example 3 exhibits superior durability in repeated rewriting to that of Comparative Example 2.

TABLE 2

| | Crystallization temperature Tx (°C.) | Crystallization time tx (ns) | Power to make amorphous P a (mW) |
|---|---|---|---|
| Example 3 | 129 | 60 | 10 |
| Example 4 | 136 | 120 | 10 |
| Comp. Ex. 2 | 134 | 20 | 14 |
| Comp. Ex. 3 | 101 | 30 | 11 |
| Ref. Ex. | 143 | 160 | 11 |

It is seen from the above results that the optic recording media of Examples 3 and 4 are, as a whole, superior to those of Comparative Examples 2 and 3 and Reference Example as described in detail below.

CRYSTALLIZATION TEMPERATURE

The crystallization temperature is more or less the same in the media other than that of Comparative Example 3 and is about 130° C. or higher. Therefore, the optic recording media other than that of Comparative Example 3 provide relatively good storage stability of the recorded information.

While FIG. 7 shows the mean reflectance of the medium of Example 3 at the heating rate of 20° C./min, it was found that the crystallization temperature was about 140° C. at the rate of 60° C./min and about 150° C. at the rate of 100° C./min, and that the amorphous marks were more stable.

CRYSTALLIZATION TIME

The optic recording media other than that of Reference Example have the crystallization time of 120 ns or less and can be practically used for high speed recording or rewriting.

POWER TO MAKE AMORPHOUS

The optic recording medium of Comparative Example 2 is superior to those of Comparative Example 3 and Reference Example in crystallization temperature and crystallization time, but the former needs the laser power for making amorphous as high as 14 mW and is considered to have very low sensitivity. Further, the medium of Comparative Sample 2 exhibits the contrast ($\Delta R/R$) changed linearly as the laser power increases, as shown in FIG. 11. Thus the medium of Comparative Example 2 is inferior to those of Example 3 and 4 in terms of the S/N stability.

DURABILITY IN REPEATED REWRITING

As is seen from the results about the power to make amorphous in Table 2, the optical recording medium of Comparative Example 2 requires high laser power for recording and rewriting and, as the result, thermal stress is applied onto materials of the optical recording medium so that the materials are thermally deteriorated upon repeated rewriting. Further, the inorganic dielectric layer (2) and (4) are damaged due to strong stress generated on the inorganic dielectric layers (2) and (4) made of ZnS which are adjacent to the recording material layer because of large volume difference between the crystalline phase and the amorphous phase of $Ge_2Sb_2Te_5$ which constitutes the recording material layer. Thus, the optic recording medium of Comparative Example 2 is inferior in the durability in repeated rewriting to those of Examples 3 and 4.

As described above and demonstrated in the Examples, since the recording material constituting the recording material layer in the optical recording medium of this invention consists essentially of at least one Group Vb element selected from As, Sb, and Bi and at least one Group VIb element selected from S, Se, and Te and has a composition corresponding to that of a mixture of at least two stoichiometric compounds represented by the chemical formula $Vb_2VIb_3$, the recording material layer easily forms an amorphous phase, with the thus-formed amorphous-phase regions being highly stable, and further the recording material layer can have a reduced crystallization time.

Therefore, the optical recording medium of this invention has advantages that stable recording and erasing of information are possible over a wide linear speed range so that reproduced signals are of good quality and high recording sensitivity is attained, and that the recorded information can be stored for a prolonged period of time.

Another advantage of the optical recording medium of this invention is that since the recording material layer has the property of absorbing visible and near infrared light because the recording material constituting the recording material layer contains at least one of Se and Te, widely utilized semiconductor lasers or the like may be used.

Still other advantages of this invention are that in the case where the recording material having the above specified composition is a single-phase material consisting essentially of stoichiometric compounds, the free energy of the recording material in a crystalline phase becomes even lower so that the crystallization time thereof can be even more reduced, and that since the crystalline phase does never undergo phase separation, the recording characteristic of the recording material layer are not impaired even if rewriting is repeated many times.

A further advantage of this invention is that in the case where the above-described stoichiometric compounds are congruent compounds, there is no formation of other substances during cooling operations, so that the characteristics of the recording material layer are not impaired even if rewriting is repeated many times.

Still a further advantage of this invention is that in the case where the recording material having the above-specified composition is a single-phase material consisting essentially of a solid solution, since the crystalline phase does never undergo phase separation, the recording material layer has a reduced crystallization time and the recording characteristics thereof are not impaired even if rewriting is repeated many times.

Still another advantage of this invention is that in the case where the recording material is a solid solution represented by $(Sb_2Te_3)_{1-x}(Bi_2Se_3)_x$ wherein $0<x<0.3$, since the recording material forms an amorphous phase more easily and the resulting amorphous phase is more stable, high speed recording and rewriting can be effected, thermal stress to the material can be minimized, the durability in repeated rewriting can be improved, and the recorded information can be retained for a long period of time.

While the invention has been described in detail and with reference to specific embodiments thereof, it will be apparent to one skilled in the art that various changes and modifications can be made therein without departing from the spirit and scope thereof.

What is claimed is:

1. An optical recording medium capable of recording, rewriting and erasing information utilizing changes in optical properties, which comprises a substrate having thereon a layer of a recording material that changes reversibly in optical properties thereof upon irradiation with light or application of heat, wherein said recording material consists essentially of at least one element of Group Vb of the periodic table selected from the group consisting of As, Sb, and Bi and at least one element of Group VIb of the periodic table selected from the group consisting of S, Se, and Te; has a composition corresponding to that of a mixture of at least two stoichiometric compounds represented by the chemical formula $Vb_2VIb_3$; and contains at least one of Se and Te.

2. An optical recording medium as in claim 1, wherein said recording material is a single-phase material consisting essentially of said stoichiometric compounds.

3. An optical recording medium as in claim 2, wherein said stoichiometric compounds are congruent compounds.

4. An optical recording medium as in claim 1, wherein said recording material is a single-phase material consisting essentially of a solid solution.

5. An optical recording medium as in claim 1, wherein said recording material consists essentially of a solid solution represented by $(Sb_2Te_e)_{1-x}(Bi_2Se_3)_x$ wherein $0<x<0.3$.

6. An optical recording medium as in claim 5, wherein said recording material consists essentially of a solid solution represented by $(Sb_2Te_3)_{1-x}(Bi_2Se_3)_x$ wherein $0.05 \leq x < 0.3$.

7. An optical recording medium as in claim 1, wherein said stoichiometric compound represented by the chemical formula $Vb_2VIb_3$ is selected from the group consisting of $Sb_2Te_3$, $Sb_2S_3$, $Bi_2Se_3$, $Bi_2Te_3$, $Bi_2S_3$, $As_2Se_3$, $As_2Te_3$, $As_2S_3$, $Sb_2SeTe_2$, $Bi_2SeTe_2$, $Bi_2Se_2Te$ and $Bi_2Ste_2$.

8. An optical recording medium as in claim 1, wherein said mixture contains one of stoichiometric compounds represented by the chemical formula $Vb_2VIb_3$ in an amount of from 5 to 95 mol% based on the mixture.

9. An optical recording medium as in claim 1, wherein the total content of Se and Te in the recording material is not less than 30 atomic% based on the total atoms constituting the recording material.

10. An optical recording medium as in claim 1, which comprises the substrate having thereon, in sequence, the layer of a recording material and a protective layer.

11. An optical recording medium as in claim 10, which further comprises an inorganic dielectric layer formed between the layer of a recording material and the substrate or the protective layer.

12. An optical recording medium as in claim 1, wherein said layer of a recording material has a thickness of from 10 to 200 nm.

* * * * *

UNITED STATES PATENT AND TRADEMARK OFFICE
CERTIFICATE OF CORRECTION

PATENT NO. : 5,268,254
DATED : December 07, 1993
INVENTOR(S) : Osamu Ueno et al.

It is certified that error appears in the above-indentified patent and that said Letters Patent is hereby corrected as shown below:

On the Title Page:

Abstract, front page, line 14, change "Vb-hd2Vib$_3$" to --Vb$_2$VIb$_3$--.

Claim 5, column 14, line 65, change "(Sb$_2$Te$_e$)$_{1-x}$" to --(Sb$_2$Te$_3$)$_{1-x}$--.

Signed and Sealed this

Twenty-third Day of August, 1994

Attest:

BRUCE LEHMAN

*Attesting Officer*   *Commissioner of Patents and Trademarks*